(12) United States Patent
Buchholz et al.

(10) Patent No.: US 9,715,829 B2
(45) Date of Patent: Jul. 25, 2017

(54) METHOD FOR COORDINATING THE OPERATION OF MOTOR VEHICLES

(71) Applicant: Audi AG, Ingolstadt (DE)

(72) Inventors: Jan Buchholz, Ergolding (DE); Stephan Lorenz, München (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/298,106

(22) Filed: Jun. 6, 2014

(65) Prior Publication Data

US 2014/0372016 A1    Dec. 18, 2014

(30) Foreign Application Priority Data

Jun. 13, 2013    (DE) ........................ 10 2013 009 860

(51) Int. Cl.
| | |
|---|---|
| B61L 17/02 | (2006.01) |
| B61L 1/18 | (2006.01) |
| B61L 7/00 | (2006.01) |
| B61L 23/24 | (2006.01) |
| G08G 1/16 | (2006.01) |
| G08G 1/04 | (2006.01) |
| G06K 9/00 | (2006.01) |
| G08G 1/01 | (2006.01) |

(52) U.S. Cl.
CPC ......... *G08G 1/161* (2013.01); *G06K 9/00785* (2013.01); *G08G 1/0116* (2013.01); *G08G 1/04* (2013.01); *G08G 1/164* (2013.01); *G08G 1/166* (2013.01)

(58) Field of Classification Search
CPC ........ G08G 1/161; G08G 1/164; G08G 1/166; G08G 1/04

USPC .......................................................... 701/117
See application file for complete search history.

(56) References Cited

U.S. PATENT DOCUMENTS

| | | | |
|---|---|---|---|
| 6,404,334 B1 * | 6/2002 | Chao ........................ | B60Q 1/22 340/464 |
| 7,899,621 B2 | 3/2011 | Breed et al. | |

(Continued)

FOREIGN PATENT DOCUMENTS

| | | |
|---|---|---|
| CN | 101395647 | 3/2009 |
| CN | 101681562 | 3/2010 |

(Continued)

OTHER PUBLICATIONS

Chinese Search Report issued on Dec. 22, 2015 with respect to counterpart Chinese patent application 201410264013.X.
Translation of Chinese Search Report issued on Dec. 22, 2015 with respect to counterpart Chinese patent application 201410264013.X.

*Primary Examiner* — Yazan Soofi
(74) *Attorney, Agent, or Firm* — Henry M. Feiereisen LLC (57) ABSTRACT

A method for coordinating operation of motor vehicles with a coordination device having a sensor, a computing device and a communication device includes determining from sensor data location and movement information of the motor vehicles, calculating an expected trajectory for each motor vehicle from the location and movement information, checking whether trajectories of different motor vehicles spatially and temporally overlap so as to create a conflict, in the event of a conflict transmitting a driving instruction to at least one motor vehicle, and executing the driving instruction or displaying the driving instruction on a display device of the at least one motor vehicle.

16 Claims, 3 Drawing Sheets

(56) References Cited

U.S. PATENT DOCUMENTS

| | | | |
|---|---|---|---|
| 8,209,120 B2* | 6/2012 | Breed | G08G 1/161 340/539.2 |
| 2001/0020902 A1* | 9/2001 | Tamura | G01C 21/3697 340/905 |
| 2007/0054685 A1 | 3/2007 | Kellum | |
| 2008/0162036 A1* | 7/2008 | Breed | 701/207 |
| 2008/0238723 A1* | 10/2008 | Fein | G06Q 30/0244 340/988 |
| 2008/0266072 A1* | 10/2008 | Suzuki | G08G 1/0962 340/438 |
| 2010/0100324 A1* | 4/2010 | Caminiti et al. | 701/301 |
| 2012/0209516 A1* | 8/2012 | Lee | G01C 21/165 701/445 |
| 2012/0249343 A1* | 10/2012 | Thomas | G08G 1/0967 340/905 |
| 2013/0099911 A1 | 4/2013 | Mudalige et al. | |
| 2013/0169679 A1* | 7/2013 | Su | G09G 5/377 345/633 |
| 2013/0338878 A1 | 12/2013 | Fritz et al. | |
| 2014/0005875 A1 | 1/2014 | Hartmann et al. | |

FOREIGN PATENT DOCUMENTS

| | | |
|---|---|---|
| CN | 102368351 | 3/2012 |
| CN | 103155014 | 6/2013 |
| DE | 102006041569 | 5/2007 |
| DE | 102006046697 | 4/2008 |
| DE | 102007058538 | 6/2009 |
| DE | 102008030550 | 1/2010 |
| DE | 102008042565 | 4/2010 |
| DE | 102010001304 | 9/2011 |
| DE | 102011113019 | 5/2012 |
| DE | 10 2012 203 182 | 9/2012 |
| DE | 10 2012 203 673 | 10/2012 |
| DE | 102012005272 | 10/2012 |
| DE | 10 2012 218 935 | 4/2013 |
| EP | 1 569 183 | 8/2005 |
| EP | 2 164 059 | 3/2010 |
| EP | 2 447 928 | 5/2012 |
| WO | WO 2012/145761 | 10/2012 |

* cited by examiner

METHOD FOR COORDINATING THE OPERATION OF MOTOR VEHICLES

CROSS-REFERENCES TO RELATED APPLICATIONS

This application claims the priority of German Patent Application, Serial No. 10 2013 009 860.2, filed Jun. 13, 2013, pursuant to 35 U.S.C. 119(a)-(d), the content of which is incorporated herein by reference in its entirety as if fully set forth herein.

BACKGROUND OF THE INVENTION

The present invention relates to a method for coordinating the operation of at least one first and at least one second motor vehicle by at least one coordination device.

In the development of modern motor vehicles, driving assistance systems, which support the driver in collision avoidance, are increasingly important. These systems are partly formed as pure reference systems, i.e. systems that can provide visual and/or audio cues to a driver in an impending collision. However, systems are also known that are able to initiate the automatic avoidance operations, automatic braking and the like.

Conventional systems determine in each case from the available sensor information in a motor vehicle possible alternative trajectories. If several vehicles are involved in a critical situation, then a proposed or an automatically executed trajectory is determined by each motor vehicle individually. However, when such trajectory is determined separately for each vehicle, an adaptation of the trajectories of the other vehicles involved in the conflict can not be taken into account which frequently prevents an optimal resolution of the conflict situation.

It would therefore be desirable and advantageous to obviate prior art shortcomings and to provide an improved method for coordinating the operation of a plurality of motor vehicles that attains a better resolution of conflicts in road traffic.

SUMMARY OF THE INVENTION

According to one aspect of the present invention, a method for coordinating an operation of at least one first and at least one second motor vehicle by way of at least one coordination device configured as a stationary infrastructure device or as part of a third motor vehicle and having at least one sensor, a computing device and a communication device, includes:

recording sensor data with the at least one sensor of the at least one coordination device, determining with the computing device location information and movement information of the first and the second motor vehicle by using the sensor data, calculating with the computing device at least one expected trajectory for each of the first and the second motor vehicle by using the respective location information and movement information, checking with the computing device the at least one expected trajectory for each of the first and the second motor vehicle for conflicts that occur due to a spatial and temporal overlap of the at least one trajectory of the first motor vehicle with the at least one trajectory of the second motor vehicle, determining with the computing device a driving instruction for at least one of the first and second motor vehicle when a conflict has been determined to exist, transmitting with the communication device the driving instruction to the at least one first and second motor vehicle, and executing the driving instruction with the at least one first and second motor vehicle or displaying the driving instruction on a display device of the at least one first and second motor vehicle, or both.

The invention is based on the idea that in the event of a conflict between the trajectories of motor vehicles, at least one trajectory should be adjusted by a third, neutral party, i.e. neither by the first motor vehicle nor by the second motor vehicle. In particular, such a third, neutral party should always monitor the traffic situation, identify potential conflicts between the trajectories of motor vehicles and solve these conflicts much like a "referee".

The coordination device, i.e. the neutral third device that detects and resolves conflicts, may in particular be a stationary infrastructure device. In this case, the coordination device may also consist of several locally spaced components. For example, cameras and other sensors are already present at numerous intersections and other points where problematic driving situations frequently arise. A coordination device can now be formed by connecting one or more of these cameras via a communication link with a computing device that analyzes data from the camera(s), detects vehicles in the data, calculates potential trajectories of the motor vehicles and checks these trajectories for conflicts, and transmits to at least one of the vehicles a driving instruction by way of a communication device when a conflict between the trajectories occurs, so as to prevent impending conflicts.

Such driving instructions may be driving instructions describing simple, especially longitudinal interventions or transverse interventions. For example, a request for braking, accelerating or left or right steering may be transmitted as to a motor vehicle as a driving instruction. The driving instruction may also be more specific, for example, an instruction to decelerate by 3 km/h or to accelerate by 2 m/s$^2$ for 3 seconds may be transmitted. However, the driving instruction may also include a complete trajectory with braking and steering interventions at different times, and the like. With the driving instruction, the trajectory of at least one of the motor vehicles is adapted such that conflicts between the trajectories of the motor vehicles are prevented to the greatest possible extent. Methods for preventing trajectory conflicts and path finding algorithms are known in the art and will thus not be explained in detail.

If a conflict between the trajectories cannot be avoided at the time the driving instruction is determined, then the coordination device may also determine driving instructions for the motor vehicles that minimize the consequences of a collision of an unavoidable collision, in particular personal injury. Various methods for determining driving instructions with such strategies are also known in the art.

As an alternative to constructing the coordination device as an infrastructure device, the coordination device may also be part of a third motor vehicle. Using of a third motor vehicle as a coordination device is advantageous because the method according to the invention may then also be used in places where stationary infrastructure devices are not available as coordination devices. Importantly, though, by selecting a third motor vehicle and hence a motor vehicle that is not involved in a conflict situation, a neutral party is still available as a "referee".

According to another advantageous feature of the present invention, sensor data are initially recorded by the coordination device. As already mentioned, these can be in particular camera data, although, for example, thermal data, data from ultrasonic distance sensors, radar sensors, and the like may also be used. A coordination device may have only a single sensor; however, several identical or different types of sensors may also be present. As already described, the various sensors associated with a coordination device may also be distal from each other. A coordination device may then have access, for example, to several cameras that all record an intersection and the like.

Location and movement information of at least a first and a second motor vehicle are then determined in the computing device from the sensor data that may in particular be image data. The first and the second motor vehicle may advantageously be detected with image recognition algorithms. Information enabling communication with the detected vehicle may also be detected. In the method according to the invention, driving recommendations must be transferred specifically to a particular motor vehicle. This is easily possible by using two-way communication between the motor vehicle and the coordination device because in this case, for example, a communication characteristic can be readily associated with a detected vehicle by way of exchanged location information.

If two-way communication does not take place, then a communication must be possible based on data from other sources, such as from automatic toll collection systems and the like, or from the recorded sensor data. This is possible, for example, by detecting a license plate, a bar code or a QR code and the like, especially in conjunction with access to a vehicle database.

Of course, driving instructions may also be transmitted to all motor vehicles, but may be additionally provided with a marking which enables the individual motor vehicle to detect whether the driving instruction for this vehicle is valid. For example, position information may be obtained with a stationary coordination device from an image recording and the position information may be transmitted together with the driving instruction. Position information can then be compared by the motor vehicle with position data present in the motor vehicle, which enables the motor vehicle to detect whether the driving instructions is destined for this vehicle. Similar identification data can also be transferred when a license plate, a vehicle type, a vehicle color, a vehicle environment or the direction of travel or the like have been detected.

Thereafter, a trajectory is determined for each of the motor vehicles from the location and movement information of the recognized and preferably also identified motor vehicles. The trajectory can be determined in the simplest case by assuming that the motor vehicle continues to move in the same direction with a constant speed. While such a determination of the trajectory may be sufficient for very short periods of time, it is beneficial for extended periods of time to make use of additional information for determining the trajectory. For example, a previous movement of the vehicle may be used as additional information. Furthermore, an active turn signal of the motor vehicle or the tire position of the motor vehicle may be detected. In addition, environmental information and trajectories from other motor vehicles may be used to compute the trajectory of a single motor vehicle. It can therefore initially be assumed, at least for parts of the trajectory in the distant future, that motor vehicles avoid obvious obstacles and collisions.

The information obtained directly from the current and previous information may be supplemented by information relating to the typical traffic flow at the observed location. For example, depending the location and time, it may be much more likely that a motor vehicle turns into one particular direction rather than into a different direction, and the like. Even more advantageously, the vehicles may provide additional information via a communication protocol, such as a Car2x or a Car2Car protocol. For example, a motor vehicle may provide information about a scheduled maneuver; alternatively or in addition, vehicle parameters, such as a steering angle, a position of a brake pedal or an accelerator pedal, and the like may be transmitted.

Using the available information, one or more trajectories for each of the vehicles may be determined. When determining several trajectories, probabilities that this trajectory is actually executed may advantageously be determined. When one or several trajectories are determined for each motor vehicle, it can be checked in a subsequent step whether the trajectories of the first and second motor vehicle are in conflict with each other, i.e. whether a spatial or temporal overlap occurs between the trajectories. Such a recognized conflict of trajectories points to an impending collision between motor vehicles. It is therefore advantageous to transmit to at least one of the motor vehicles a driving instruction that eliminates this conflict. As a limitation, only those conflicts between trajectories may be considered that have a certain minimum probability, or conflicts may initially not be considered that are very far in the future. It is highly likely in both situations that the conflict can be autonomously avoided by the driver or by a driver assistance system. It will be understood that motor vehicles having trajectories with such an unlikely or such a temporally distant conflict can continue to be monitored separately in order to be able to timely intervene in an impending occurrence of a conflict.

In all other situations where a conflict is detected, a driving instruction for the first and/or the second vehicle is determined, which is thereafter transmitted to these vehicles. It is essential here that a single coordination device has control over the adaptation of the trajectories of both vehicles. Thus, the trajectories of both vehicles can be adjusted by a single coordination device or the coordination device can recognize that adapting one of the trajectories of motor vehicles is adequate.

Unlike with a conventional method, where corrected trajectories for motor vehicles are calculated separately in potential conflict situations, it is here not possible that the corrected trajectories of motor vehicles mutually cancel each other or interfere with each other. Continued use of the driving instruction transmitted to the first and/or second motor vehicle depends heavily on the degree of driving automation of the respective motor vehicle. Thus, when a motor vehicle is driven in a non-automated driving mode, a message for avoiding an impending conflict situation may be outputted in a motor vehicle to the driver. A voice message such as "Please slow down" may be outputted or a flashing arrow indicating to a coordination device to use this information when determining the trajectory of the respective vehicle. Accordingly, trajectories for one or several of the motor vehicles may be determined by each or at least some of the coordination devices. It is important only that only one of the coordination devices, namely the selected coordination device, represents the "contact" for the motor vehicles, and that therefore only the selected coordination device transmits driving instructions to one or several motor vehicles.

The coordination devices may be selected in various ways. It is important that the coordination device is always determined in the same manner in an area where the method according to the invention is used, so that each of the vehicles involved can recognize the selected coordination device.

For example, at least one motor vehicle priority information may advantageously be stored in the control device of each of the first and second motor vehicle, wherein the motor vehicle whose control device selects the selected coordination device is determined as a function of this motor vehicle priority information.

Since the method according to the invention essentially addresses the problem of determining a neutral coordination device, this priority information may be information with an essentially random distribution across the motor vehicles. Thus, for example, a serial number of a particular component, a MAC address of a communication interface or another substantially randomly distributed but unique identifier of a motor vehicle may be used. When such identifier is not available, the control device selected by the coordination device may alternatively be randomly determined. Furthermore, the selecting motor vehicle may be selected from the type of vehicle or, for example, an association of the vehicle with an emergency service and the like.

When, as described above, a motor vehicle is initially selected and the control device of the motor vehicle thereafter selects a coordination device, additional communication steps are required. It may therefore be advantageous to select the coordination device based on a feature of the coordination device itself. In particular, coordination device priority information may be stored in each of the coordination devices, and the selected coordination device may be determined based on this coordination device priority information. The coordination device priority information may more particularly depend on the number, type and location of the sensors of the coordination device. The coordination device priority information may also depend on the available computing capacity of the computing device of the coordination device or on an available communication bandwidth. In particular, the coordination device priority information may be dynamically adapted in order to dynamically divide the coordination load between several coordination devices.

In the process according to the invention, the first and the second motor vehicle may advantageously be monitored by the same coordination device for a long period of time so as to be able to dynamically transmit to the vehicles new driving directions when a conflict between their trajectories arises, until the conflict of the trajectories is finally resolved. This factor may also be considered when selecting the selected coordination device. In particular, the coordination devices, whose sensors capture the first and the second motor vehicle, may determine location and movement information of the first and second motor vehicle and determine an estimated residence time of both vehicles in a detection area of each sensor, wherein the selected coordination device is selected depending on the expected residence time. In particular, in the selection, the estimated residence time may be combined with the aforementioned priority information, in particular the coordination device priority information. For example, the coordination device with the highest coordinating device priority information may be selected, for which a residence time of for example at least three seconds was determined. Conversely, however, the coordination device may also be selected initially in accordance with coordination device priority information, but to override this selection by selecting a coordination device with lower coordination device priority information, if a much longer residence time was determined for this selected coordination device.

In particular, when all the considered features, such as the residence time and the coordination device priority information are identical for several coordination devices, the selected coordination devices may also be selected randomly.

Furthermore, at least one coordination device, which is different from the selected coordination device and whose sensor detects the first and/or the second motor vehicle, may transmit sensor data and/or detected location information and/or detected movement information and/or at least one calculated trajectory to the selected coordination device. In this case, a network of two or more coordination devices is formed, and more particularly all the information about the first and the second motor vehicle gathered in the network is combined and commonly used in order to determine the most accurate trajectories for the first and the second motor vehicle and to hence achieve the best possible prediction about possible conflicts of the trajectories of the first and second motor vehicle.

For example, a plurality of motor vehicles in the vicinity of the first and of the second vehicle may include coordination devices and at the same time one or more infrastructure devices may be available for coordinating motor vehicles. In this case, it is possible that, the existing infrastructure devices may in principle be preferably selected as coordination devices because infrastructure devices have typically a larger number of sensors and the sensors of infrastructure devices are often located in places that allow a particularly good overview of what is happening. At the same time, parts of the traffic may be obscured by motor vehicles or other obstructions. In this case, the coordination devices existing in third vehicles may be used to determine additional information about the obscured areas and to transmit the obtained information to the selected coordination device.

It will be understood that information may also be exchanged between several coordination devices located in motor vehicles and/or between several stationary infrastructure devices. The transmitted information provided may also be used in the determination of the driving instruction.

Moreover, one or several of the coordination devices that are not necessarily the selected coordination device may determine additional information, such as information from a Car2x-communication, traffic control systems and the like. Such information may also be provided to the selected coordination device.

In particular, the sensor of the coordination device or of one of the coordination devices may include an image sensor, in particular a camera, wherein an image recognition algorithm is used for determining the location or movement information of the first and second motor vehicle. For example, a motor vehicle may be detected based on to scale-invariant features, corner detection, or edge detection. In particular, additional identification features may be detected on motor vehicles, such as license plates, bar codes and the like.

Advantageously, the communication device may be adapted to receive messages from the first and second motor vehicle. In this case, in particular, information can be obtained that supplements the sensor information. Thus, in particular via Car2x-communication, each of the motor vehicles may, for example, transmit its own position, parameters of the motor vehicle, such as speed, steering angle and the like and/or planned maneuvers. In particular, transmission of planned maneuvers may significantly improve the trajectory prediction for medium and longer time periods, especially when the motor vehicle is driven at least partly automatically. Typical maneuver information transmitted by a motor vehicle may include, for example, a planned lane change, a planned turn and the like. Furthermore, a control device of a motor vehicle may make predictions during manual operation of the vehicle by evaluating a plurality of vehicle parameters, for example, a planned route of a navigation system, the behavior of a driver, the speed or similar driving maneuvers and transmit these predictions to the coordination device.

The first and/or the second motor vehicle may include a determination device for determining location data, wherein the determined location data may be transmitted to the coordination device and used by the computing device for detecting the vehicle in the sensor information and/or for determining the location information for the motor vehicle. Movement information can also be obtained when location information is transmitted multiple times.

The transmitted location data also facilitates the association between the motor vehicles in the sensor images with the employed communication channels. This is especially true when the coordination device is a stationary infrastructure device. Since the position and direction of view of the sensors is known for stationary infrastructure devices, the location information transmitted from the motor vehicle can be easily reconciled with a location in the sensor data, thereby allowing easy identification of objects. A similar approach is possible for the coordination device in a motor vehicle, when the location information and advantageously also the orientation of the vehicle are known for the motor vehicle itself.

As mentioned above, the first and/or the second motor vehicle may advantageously transmit proposed driving maneuvers to the coordination device.

It may happen that the obtained data relating to a motor vehicle are not sufficient to predict an unambiguous trajectory for the medium and longer prediction time periods. In this case, at least two probable trajectories may be determined for the first and/or second motor vehicle, and a probability value describing the probability for driving along the respective predicted trajectory may be determined for each of the determined trajectories. Additionally or alternatively, for example driving corridors may also be calculated, which become wider with a progressive time horizon. In addition, these driving corridors may also be weighted with a probability distribution.

Determining the probability for the trajectories enables in the event of a determined conflict a prediction of the probability with which this conflict occurs. In particular, only trajectories with a predetermined minimum probability may be taken into account when determining conflicts. Alternatively, only those conflicts may be taken into account where the probability expressed as the product of trajectory probabilities exceeds a defined minimum probability.

Alternatively or in addition, the probability of the trajectories resulting in a conflict may also be used to determine the driving instruction. This is possible particularly for conflicts that lie in the future by a certain minimum time, for example a few seconds. For example, for a conflict between very probable trajectories, which lies three seconds in the future, a driving instruction may be transmitted that signals to the user, for example, strong braking or even leads to a direct intervention in the longitudinal guidance of the motor vehicle. However, if such conflict is very unlikely, a reaction may initially be delayed or it may initially be sufficient to output only a warning to a user of a motor vehicle.

According to another aspect of the invention, a coordination device includes a sensor, a computing device and a communication device and is configured execute the aforedescribed method.

According to yet another aspect of the invention, a motor vehicle includes the aforedescribed coordination device.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
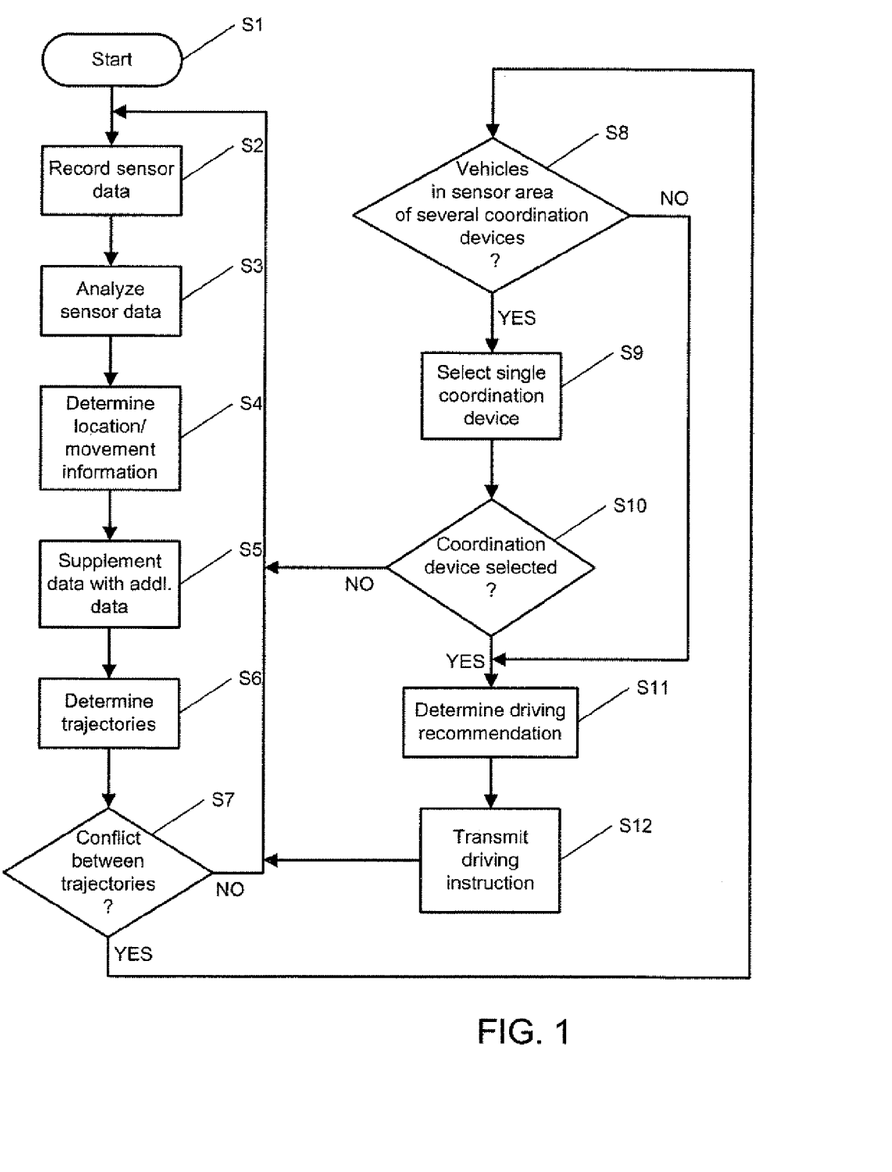
FIG. 1 is a flow diagram of an exemplary embodiment of a method according to the present invention.

Turning now to the drawing, and in particular to FIG. 1, there is shown an exemplary embodiment of a process flow diagram of a method for coordinating the operation of motor vehicles. After the start of the process at step S1, where for example a coordination device can be activated by, for example, detecting with a motion detector that motor vehicles are in the relevant area, sensor data are recorded at step S2 by at least one sensor of the coordination device. The at least one sensor may in particular be a camera recording images once or continuously throughout the entire process. The image data recorded at step S2 and/or the additional recorded image data are analyzed at step S3, for example by using a method for recognizing scale-invariant features. Motor vehicles, in particular the first and the second vehicle, are thereby identified in the sensor data. Preferably, the first and the second motor vehicle are detected in at least two temporally spaced data sets of sensor data. In this way, not only location information for the location where the motor vehicles are located, but also movement information can also be obtained exclusively from image information. Identification features of the motor vehicles are advantageous also detected at step S3, which may be used, in particular, to directly recognize information via a communication channel with the motor vehicle. For example, license plates, vehicle types, vehicle colors and the like can be detected. The position of the motor vehicle or, for example, the direction of movement of the motor vehicle can be used in subsequent driving to identify the vehicle.

After the vehicles have been recognized in preferably several successive data sets of the sensor data, location and movement information can be determined at step S4. Other known information may be used to determine the location and movement information. For example, it may be assumed that all detected vehicles are on the road surface. The degree of freedom of the location information is thereby limited to two dimensions, so that a single camera image is in most situations already sufficient, to determine the location information for a motor vehicle.

Such location is in each case determined relative to the field of view of the sensor. The position of the motor vehicle in three-dimensional space can thus be deduced directly for stationary sensors. When the coordination device is part of a motor vehicle, the sensor is typically also located on the vehicle. In this case, the position of the motor vehicle having the coordination device is advantageously initially determined. The location of a motor vehicle detected in the sensor data can then be inferred from the position of the motor vehicle and the known location of the sensor on the motor vehicle.

Movement information can particularly advantageously be identified from location information derived from temporally sequential sensor data sets having known time intervals.

The data obtained from the sensor data are supplemented at step S5 with additional data. Advantageously, the first and/or the second vehicle may transmit information to the vehicle coordination device. For example, the vehicles may transmit GPS coordinates; however, vehicle parameters such as a steering angle, a position of the accelerator and brake pedal and the like may also be transmitted. For a particularly reliable determination of the trajectory in the following method steps, planned maneuvers of the motor vehicles may advantageously also be transmitted. This is especially feasible when the motor vehicle is in a partially or fully automated driving mode. However, the vehicle may also derive a likely driving maneuver—depending on the situation—from vehicle parameters, for example, a destination in a navigation system and the behavior of the driver and transmit this driving maneuver to the coordination device. At step S5, additional data can be gathered from external sources, such as information about a traffic light and the like can be obtained from a traffic management system.

The information obtained at steps S4 and S5 is used at step S6 to determine a trajectory for at least the first and the second motor vehicle. Additional information also can be used for determining the trajectory. For example, the positions and speeds of other motor vehicles can be identified from the sensor data and the movement of other vehicles can then be used as constraints for the trajectory of the first and of the second motor vehicle. In addition, statistical information can be used at step S6 for determining the trajectory. For example, it may very likely at a particular location and at a particular time that a motor vehicle travelling in a particular lane at a certain speed turns or does not turn.

Typically, at step S6, no unambiguous trajectory can be pre-determined for the first or the second motor vehicle at least for the medium and longer time periods. In this case, a plurality of trajectories may be determined for the first or the second motor vehicle. In particular, a probability value indicating a likelihood that this trajectory is actually executed may be stored for each of these trajectories when these trajectories are calculated.

At step S7, it is determined for the determined trajectories of the first and second motor vehicle, whether these trajectories are in conflict with each other, i.e. whether the trajectories will have a mutual temporal or spatial overlap. To determine the overlap of the various trajectories, they should not be considered as one-dimensional objects, i.e. as lines, but each of these trajectories should be regarded as driving corridor which is at least as wide as the motor vehicle plus a safe distance to be maintained between the motor vehicles.

When several trajectories are determined for the first and/or second motor vehicle, it can be determined for each pair of the trajectories of the first and second motor vehicle whether a conflict occurs between these trajectories. However, a conflict may also be determined only for trajectories having a certain minimum probability or those pairs of trajectories for which the product of the trajectory probability has a certain minimum probability. If it is determined at step S7 that a conflict does not occur for any of the calculated trajectories, then the method can be repeated from step S2 on, i.e. new sensor data are recorded and it is checked whether a conflict between the trajectories of the motor vehicles can be inferred from the sensor data.

If a conflict was determined at step S7, it is checked at step S8, whether the first and the second motor vehicle are located in the sensor area of several coordination devices. If the first and the second motor vehicle are located exclusively in the sensor area of a single coordination device, then the method can be continued directly at step S11 because conflicting driving instructions cannot be generated with a single coordination device.

However, if it is determined that the motor vehicles are located in the sensor area of several coordination devices, then it must be ensured in the additional method steps that only a single coordination device transmits movement instructions to the motor vehicles in order to prevent that two contradictory driving instructions are transmitted to a motor vehicle or that a driving instruction is transmitted to a first of the motor vehicles by a first coordination device and a separate driving instruction is sent to a second of motor vehicles by a second coordination device, which would in turn lead to a separate conflict treatment.

For this reason, a single coordinating device to be used in the additional method steps is selected at step S9. Since the preceding steps have been executed by all coordination devices where the first and the second motor vehicles are in their field of view, each of these coordination devices has also determined trajectory information. Therefore, it can be determined at step S9, for example, based on this trajectory information and the possibly existing probability of these trajectories, how long the first and the second motor vehicle are expected to be located in the sensor area of each coordination device. The particular coordination device can then be selected that includes the sensors most likely to detect the vehicle for the longest time. The type of sensors, the number of sensors and the placement of the sensors may also be known for each coordination device. Priority information can then be determined from this information, which indicates how well a particular coordination device can assess the traffic situation in each case. In addition, the priority of the coordination device may be determined by the respective load of the coordination device. For example, with an otherwise similar priority and similar residence time, a coordination device be selected that is less loaded.

After determining the selected coordination device, is checked by each coordination device at step S10 whether the coordination device is the selected coordination device. If a coordination device was not selected as the selected coordination device, then the unselected coordination device may transmit sensor data, location data, movement or trajectory data to the selected coordination device and then return to the beginning of the method. Conversely, if the coordination device is the selected coordination device, then it determines at step S11 a driving recommendation at least for the first or the second vehicle. Such a driving recommendation may include, for example, the instruction to brake, to accelerate or to steer in a certain direction. The type of the driving information may depend on whether the motor vehicle to which the driving information is transmitted is controlled by a driver, or is partially or fully automatically controlled. With fully automatic control, for example, accurate information can be transmitted, such as the instruction to decelerate the vehicle for two seconds with an acceleration of 2 m/s². If the motor vehicle is controlled by a driver, only a coarse driving instruction, such as a simply "braking", may advantageously be transmitted. Alternatively, accurate driving directions may also always be transmitted by the coordination device, which are later adjusted accordingly and displayed or executed by a control device of the motor vehicle depending on the operating mode of the motor vehicle.

After such a driving instruction has been determined for the first and/or the second vehicle, the driving instruction can be transmitted to the respective motor vehicle at step S12. Such transmission is easily possible in particular when a prior communication took place between the motor vehicle and the coordination device. In this case, for example, the motor vehicle may already submit to the coordination device an identification number or another communication interface via which the coordination device can unambiguously contact a single motor vehicle.

If such a communication has not taken place in the previous method, a single motor vehicle can still be specifically addressed, for example by determining from the sensor data a position and a direction of movement of the motor vehicle and thereafter transmitting the driving information together with this position and direction of movement as additional information. The transmitted information is initially received by each motor vehicle; thereafter, it can be determined in each motor vehicle based on a comparison of the transmitted position and movement information and the like, whether the driving instruction is intended for the respective vehicle. The reference to the position and movement information is purely exemplary. For example, alternatively or in addition, information about the vehicle type, color, recognized license plate numbers and the like can be transmitted.

After the driving instruction has been transmitted, the method can be continued again at step S2, i.e. with a new recording of sensor data. It is particularly advantageous when coordination devices are selected that are able to observe the movement of the first and second motor vehicle for several seconds. In this case, the reaction of the first and second motor vehicle to the transmitted driving instructions can also be checked and the behavior of the first and second motor vehicle can be continuously adapted by transmitting new driving instructions. Such adjustment may continue in a continuous or step-wise fashion until the conflict situation is resolved.

It should be noted that the process shown in FIG. 1 can also be carried out for more than two vehicles, in particular to all vehicles in the image range of a sensor. However, it is frequently advantageous not to simultaneously determine driving instructions and trajectory adaptations for all vehicles in the sensor area, but to consider respective subgroups of motor vehicles that directly interact with each other. The complexity of the process can thereby be reduced.

Figure 2:
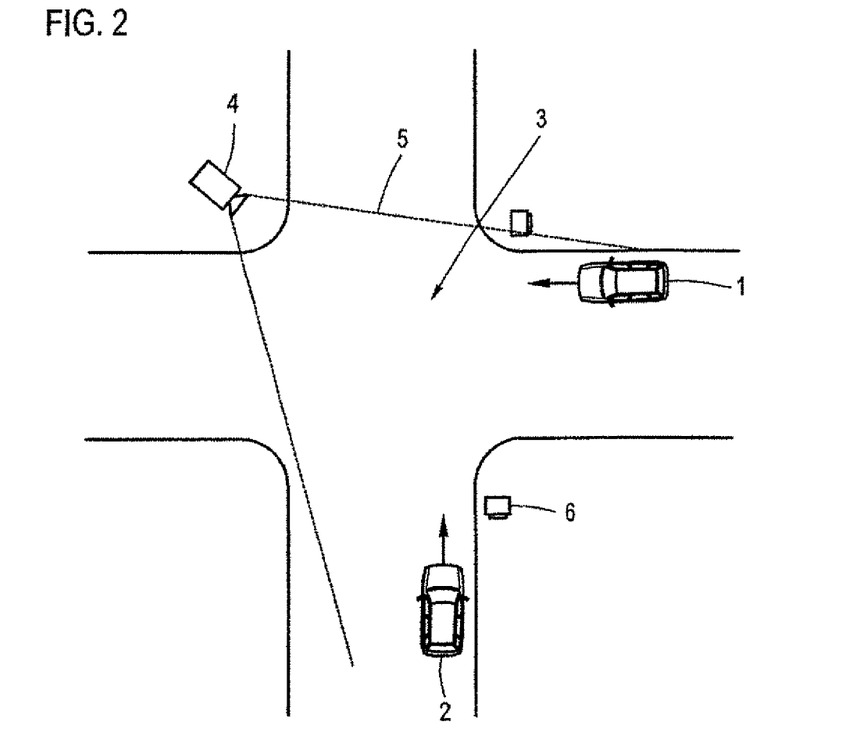
FIG. 2 illustrates a traffic situation, in which the method according to the invention can be used.

FIG. 2 shows a traffic situation in which a method for coordinating the operation of motor vehicles can be used. A first motor vehicle 1 and a second motor vehicle 2 are both moving at a certain speed toward an intersection 3. A coordination device 4 configured as a stationary infrastructure device is arranged at the intersection 3. The coordination device 4 has at least one sensor, which images a sensor area 5 in which the first motor vehicle 1 and the second motor vehicle 2 are located. Typical coordination devices may include several, even spaced-apart sensors. To more clearly illustrate the essential points, it will here be assumed for sake of simplicity that the coordination device has only a single sensor. The sensor continuously captures images of the intersection 3. From the sensor data, in this case from the image data, the coordination device 4 recognizes that the motor vehicle 1 is located before the intersection 3 and moves toward the intersection 3, and that the motor vehicle 2 is also located before the intersection 3 and moves towards the intersection 3. The coordination device 4 can, with the simplest assumption for determining the trajectory, start with the premise that the motor vehicles 1 and 2 continue to move at the same speed. In this situation, the resulting trajectories would result in a collision of the motor vehicles 1 and 2 at the intersection 3. If the coordination device 4 has no additional information available, then a conflict between the trajectories of vehicles 1 and 2 is detected and the coordination device 4 determines for at least one of the vehicles 1, 2 a driving instruction. For example, the coordination device 4 may determine for motor vehicle 1 the driving instruction that the vehicle 1 should slow down. Alternatively, it may also be advantageous to transmit information to the vehicle 2 to accelerate. In both cases, a collision can then be avoided with this driving recommendation.

If the motor vehicle 2 were, for example, to turn right in the illustrated situation and would signal its intent by setting a turn signal, then the coordination device 4 could recognize this and determine a trajectory for the motor vehicle 2 that describes that motor vehicle 2 is turning right. In this case, no conflict would initially be determined. During a continuing approach to the intersection, the probability of a turning trajectory can be adapted, for example, depending on the speed of the motor vehicle 2.

FIG. 2 also shows a traffic light 6. Information about the switching behavior of the traffic light 6 may be available to the coordination device 4. It will be assumed that the traffic light 6 is red at the intersection in the direction approached by the motor vehicle 2. This information about the switching behavior of the traffic light 6 can be used by the coordination device 4 in different ways, wherein two of these ways will now be described by way of example. In the simplest case, the trajectories and thus the conflict can be determined as described above. Since the coordination device 4 is now aware that the traffic light 6 is red, the driving instruction is to slow down transmitted to the motor vehicle 2. In this case, the additional available information is used to give driving instructions to the motor vehicles such that the traffic regulations are complied with.

The information about the traffic light can already be used by the coordination device 4 before the trajectories are determined. For example, when the motor vehicles 1 and 2 are still relatively far away from the intersection 3, the coordination device 4 can initially assume for the determination of the trajectory of the motor vehicle 2 that the motor vehicle 2 takes into account the red traffic light and slows down. Thus, a trajectory can first be calculated for the motor vehicle 2 with a high probability, which shows that the motor vehicle 2 stops at the traffic light 6, and a trajectory with a very low probability, which describes that the motor vehicle 2 runs a red traffic light 6. This may at first cause the trajectory of the vehicle 2, which indicates running the traffic light 6, to fall below a probability threshold value and hence to be initially not included in the determination of conflicts. The coordination device 4 would then also fail to find a conflict and driving instructions would not be transmitted to any of the motor vehicles 1, 2. However, when the vehicle 2 continues to approach the traffic light 6 with undiminished speed, the probability of the trajectory that describes running the traffic light would rise continuously. Even before running the red traffic light, the probability of the trajectory would thus have increased to a value which exceeds a predetermined limit value in the coordination device 4, so that the trajectory would be so taken into account when checking for conflicts. The coordination device 4 would thus transmit to the motor vehicle 2 a driving instruction to slow down.

Figure 3:
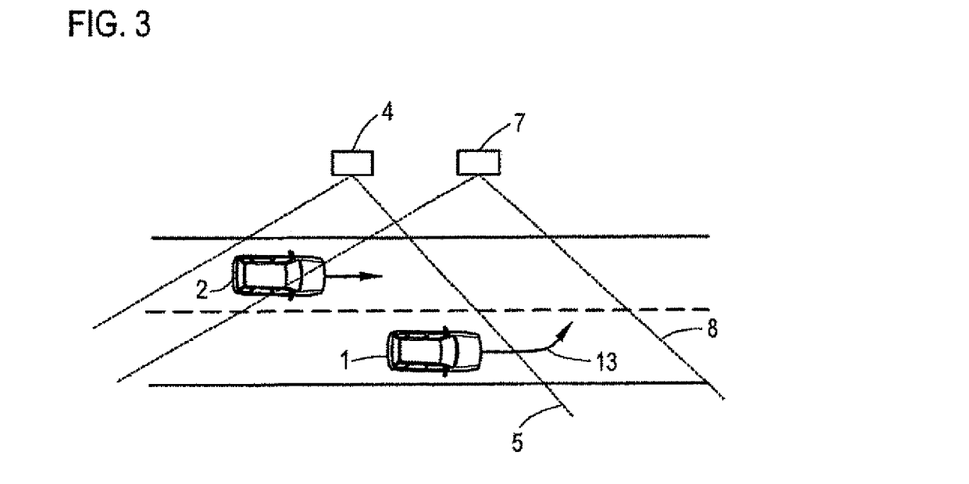
FIG. 3 illustrates a further traffic situation, in which the method according to the invention can be used.

FIG. 3 shows a traffic situation wherein the first motor vehicle 1 and the second motor vehicle 2 travel on two lanes of a road in the same direction. Two coordination devices 4 and 7 constructed as stationary infrastructure devices are positioned on the side of this road. The motor vehicles 1 and 2 are located in the sensor area 5 of the coordination device 4 and in the sensor area 8 of the coordination device 7. Since the motor vehicles 1 and 2 are located in the sensor areas of two coordination devices 4 and 7, it is necessary in the course of the method to determine, which of the coordination devices should transmit, if necessary, a driving instruction to one of the motor vehicles or to both motor vehicles. To this end, this example, a first trajectory for motor vehicles 1 and 2 is first calculated from the acquired image data in each of the coordination devices 4, 7. It is determined in the coordination device 4 and also in the coordination device 7, that the two motor vehicles are moving with a certain speed from left to right. It can thus be determined that the two motor vehicles are residing longer in the sensor area 8 of the coordination device 7 than in the sensor area 5 of the coordination device 4, so that the coordination device 7 can be designated as the selected coordination device. The two motor vehicles 1 and 2 hereby move initially in a straight line, so that no conflict of the trajectories of the motor vehicles 1 and 2 occurs with a continuation of the trajectories in a straight line, i.e. when both motor vehicles continue to move at a constant speed. However, the motor vehicle 1 transmits here to the coordination device 7 a planned maneuver 13, namely a lane change. The coordination device 7 now determines from the sensor information that the motor vehicle 1 moves noticeably more slowly than the motor vehicle 2. If the motor vehicle 1 would now perform the maneuver 13 and if the motor vehicles 1 and 2 were to continue moving with an approximately constant speed, then the trajectories of the motor vehicles 1 and 2 would overlap, i.e. there would be a risk of an accident, The coordination device 7 can thus transmit to the motor vehicle 1, for example, the driving instruction to increase the speed by a certain minimum amount before changing lanes. If the coordination device 7 detects during a repeated execution of the method that the motor vehicle 1 initiates the lane change before accelerating sufficiently, a driving instruction can be transmitted to the motor vehicle 1 not to perform the lane change or a driving instruction can be transmitted to the motor vehicle 2 to slow down. Advantageously, both driving instructions may be transmitted for maximizing driving safety.

Figure 4:
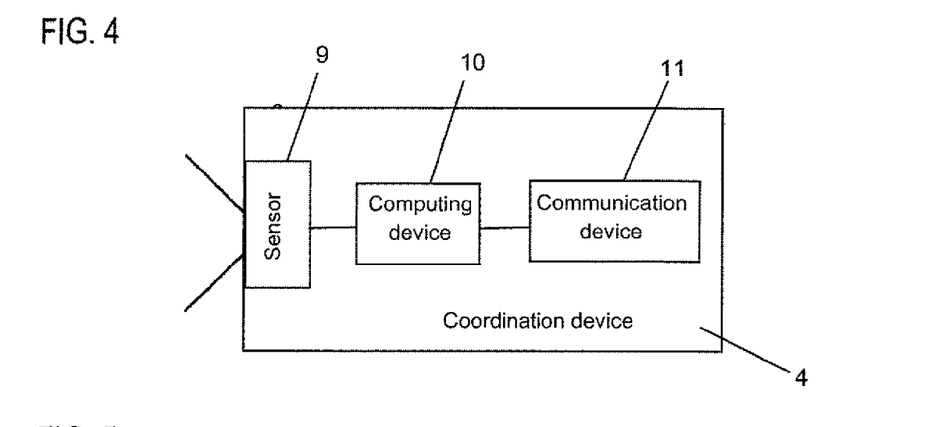
FIG. 4 is a schematic diagram of an exemplary embodiment of a coordination device according to the invention.

FIG. 4 shows an embodiment of a coordination device. The coordination device 4 includes a sensor 9, a computing device 10 and a communication device 11. All the components of the coordination device may be located, as indicated, inside a housing; however, one or several sensors may be located outside the housing, for example, to allow image acquisition of a road section from multiple perspectives. The sensor 9 may in particular be a camera; however, other sensors such as ultrasonic sensors or radar sensors may also be employed. The collected sensor data are analyzed by the computing device 10 which is configured, as explained above, to detect individual motor vehicles, to determine location and movement information for the detected motor vehicles, to calculate therefrom trajectories in conjunction with other information received, for example, via the communication device 11, and to then verify whether the trajectories from several motor vehicles overlap. In this case, the calculation device can also calculate driving instructions for the motor vehicles, and transfer the driving instructions to the motor vehicles by way of the communication device 11.

Figure 5:
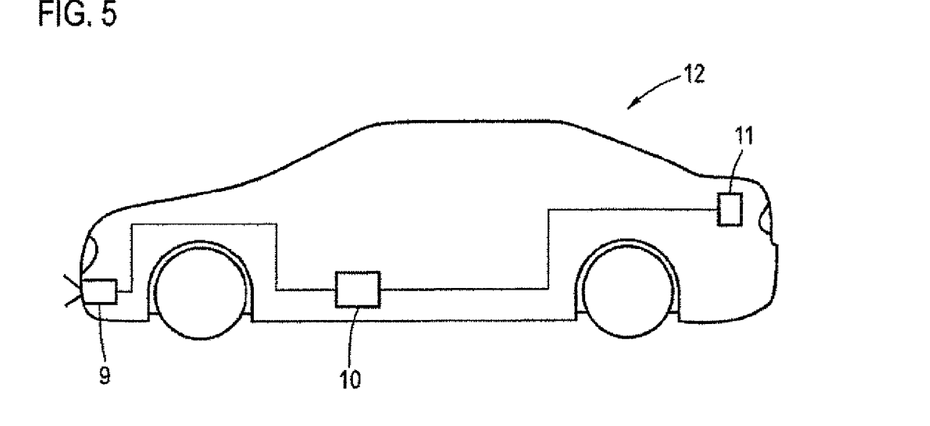
FIG. 5 is a schematic diagram of an exemplary embodiment of a motor vehicle according to the invention.

FIG. 5 shows a motor vehicle 12 with a coordination device for coordinating the operation of motor vehicles. A sensor 9 located in the front region of the motor vehicle 12 is shown here by way of example.

It will be understood that all sensors arranged on the motor vehicle 12 may be shared by the coordination device. The computing device 10 of the coordination device may be formed as a separate component, but may also function as a sub-program of a controller of the motor vehicle 12. A communication device for Car2Car-communication or Car2x-communication already present in the motor vehicle 12 may also be used as the communication device 11.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for coordinating an operation of at least one first and at least one second motor vehicle by way of at least one coordination device selected by a control device of the at least one first and second motor vehicles based upon a feature of the coordination device, the coordination device configured as part of a third motor vehicle that is different from the at least one first and the at least one second motor vehicle, with the at least one coordination device comprising at least one sensor, a computing device and a communication device, the method comprising:
recording sensor data with the at least one sensor of the at least one coordination device,
determining with the computing device location information and movement information of the first and the second motor vehicle by using the sensor data,
calculating with the computing device at least one expected trajectory for each of the first and the second motor vehicle by using the respective location information and movement information, checking with the computing device the at least one expected trajectory for each of the first and the second motor vehicle for conflicts that occur due to a spatial and temporal overlap of the at least one trajectory of the first motor vehicle with the at least one trajectory of the second motor vehicle, determining with the computing device a driving instruction for at least one of the first and second motor vehicle when a conflict has been determined to exist, transmitting with the communication device the driving instruction to the at least one first and second motor vehicle, and executing the driving instruction automatically with the at least one first and second motor vehicle by influencing the expected trajectory for the first or second motor vehicle to eliminate or lessen a severity of the conflict.

2. The method of claim 1, further comprising
upon detection of the first and second motor vehicle by the sensors of at least two of the coordination devices and prior to determining the driving instruction, selecting one of the at least two coordination devices with the computing device of at least one coordination device or with a control device of the at least one first and second motor vehicle, with only the computing device of the selected coordination device determining the driving instruction.

3. The method of claim 2, further comprising
storing a corresponding motor vehicle priority information in the control device of the first and second motor vehicle, and
depending on the motor vehicle priority information, determining the motor vehicle having the control device that selects the selected coordination device.

4. The method of claim 2, further comprising
storing coordination device priority information in each the at least two coordination devices, and
determining the selected coordination device depending on the coordination device priority information.

5. The method of claim 2, further comprising
determining location information and movement information of the first and the second motor vehicle with the at least two coordination devices, whose at least one sensor detects the first and the second motor vehicle, and
determining an expected residence time of the two motor vehicles in a detection range of the respective sensor(s), wherein the coordination device is selected depending on the expected residence time.

6. The method of claim 2, further comprising
detecting with the at least one coordination device, which is not the selected coordination device, and its at least one sensor at least one of the first and second motor vehicle, and
transmitting to the selected coordination device at least one of sensor data, location information, movement information, and at least one calculated trajectory.

7. The method of claim 1, wherein the sensor is an image-acquisition sensor, further comprising determining at least one of the location information and the movement information of the at least one first and second motor vehicle using an image recognition algorithm.

8. The method of claim 7, wherein the image-acquisition sensor is a camera.

9. The method of claim 1, wherein the communication device is configured to receive messages from the first and the second motor vehicle.

10. The method of claim 9, wherein at least one of the first and second motor vehicle includes a determination device for determining location data, the method further comprising
transmitting the location data to the at least one coordination device, and
identifying the motor vehicle in the sensor information or determining the location information for the motor vehicle by using the computing device.

11. The method of claim 9, further comprising
transferring to the coordination device driving maneuvers planned by at least one of the first and second motor vehicle.

12. The method of claim 1, further comprising
determining at least two expected trajectories are for each of the at least one first and second motor vehicle, and
determining for each of the expected trajectories a probability value describing a probability with which the respective expected trajectory will be driven.

13. The method of claim 12, wherein only trajectories with a specified minimum probability are considered when determining the conflicts.

14. The method of claim 1, wherein an expected time until an occurrence of a conflict is taken into account when calculating the driving instruction.

15. A coordination device selected by a control device of at least one first and at least one second motor vehicles based upon a feature of the coordination device, the coordination device configured as part of a third motor vehicle that is different from the at least one first and at least one second motor vehicle, for coordinating an operation of the at least one first and the at least one second motor vehicle, comprising
a sensor, a computing device and a communication device, wherein the coordination device is configured to
record sensor data with the at least one sensor of the coordination device,
determine with the computing device location information and movement information of the first and the second motor vehicle by using the sensor data,
calculate with the computing device at least one expected trajectory for each of the first and the second motor vehicle by using the respective location information and movement information,
check with the computing device the at least one expected trajectory for each of the first and the second motor vehicle for conflicts that occur due to a spatial and temporal overlap of the at least one trajectory of the first motor vehicle with the at least one trajectory of the second motor vehicle,
determine with the computing device a driving instruction for at least one of the first and second motor vehicle when a conflict has been determined to exist,
transmit the driving instruction to the at least one first and second motor vehicle, and
execute the driving instruction automatically with the at least one first and second motor vehicle by influencing the expected trajectory for the at least one first or second motor vehicle to eliminate or lessen a severity of the conflict.

16. A motor vehicle comprising a coordination device selected by a control device of at least one first and at least one second motor vehicles based upon a feature of the coordination device, the coordination device configured as part of a third motor vehicle that is different from the at least one first motor vehicle and from the at least one second motor vehicle, for coordinating an operation of the motor vehicle with the at least one second motor vehicle, the coordination device comprising
- a sensor, a computing device and a communication device, wherein the coordination device is configured to
  - record sensor data with the at least one sensor of the coordination device,
  - determine with the computing device location information and movement information of the motor vehicle and the at least one second motor vehicle by using the sensor data,
  - calculate with the computing device at least one expected trajectory for each of the motor vehicle and the at least one second motor vehicle by using the respective location information and movement information,
  - check with the computing device the at least one expected trajectory for each of the motor vehicle and the at least one second motor vehicle for conflicts that occur due to a spatial and temporal overlap of the at least one trajectory of the motor vehicle with the at least one trajectory of the at least one second motor vehicle,
  - determine with the computing device a driving instruction for at least one of the motor vehicle and the at least one second motor vehicle when a conflict has been determined to exist,
  - transmit the driving instruction to the motor vehicle and the at least one second motor vehicle, and
  - execute the driving instruction automatically with the motor vehicle and the at least one second motor vehicle by influencing the expected trajectory for the motor vehicle and the at least one second motor vehicle to eliminate or lessen a severity of the conflict.

* * * * *